(12) United States Patent
Dam et al.

(10) Patent No.: US 11,008,117 B1
(45) Date of Patent: May 18, 2021

(54) FLIGHT DECK DISPLAY STATION WITH SPLIT KEYBOARD

(71) Applicant: The Boeing Company, Chicago, IL (US)

(72) Inventors: Sandra C. Dam, Seattle, WA (US); Christopher D. Haus, Renton, WA (US); Alireza Majd, Seattle, WA (US); John Wiedemann, Bothell, WA (US); Alessandro E. Galli, Seattle, WA (US); Brandon R. Boekelman, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/798,736

(22) Filed: Feb. 24, 2020

(51) Int. Cl.
*B64D 43/00* (2006.01)
*G06F 3/02* (2006.01)
*G06F 3/023* (2006.01)

(52) U.S. Cl.
CPC .............. *B64D 43/00* (2013.01); *G06F 3/023* (2013.01); *G06F 3/0216* (2013.01); *G06F 3/0219* (2013.01)

(58) Field of Classification Search
CPC ....... B64D 43/00; G06F 3/0219; G06F 3/023; G06F 3/0216
See application file for complete search history.

(56) References Cited

U.S. PATENT DOCUMENTS

| | | | |
|---|---|---|---|
| 4,378,553 A | 3/1983 | McCall | |
| 7,489,301 B2 | 2/2009 | Chen et al. | |
| 8,083,186 B2 | 12/2011 | Suddreth et al. | |
| 9,592,771 B2 * | 3/2017 | Guering | B64D 43/00 |
| 10,279,890 B2 * | 5/2019 | De Bossoreille | G06F 3/1423 |
| 10,831,355 B2 * | 11/2020 | Staggs | B64D 43/00 |
| 2002/0129288 A1 | 9/2002 | Loh et al. | |
| 2012/0287050 A1 | 11/2012 | Wu | |
| 2018/0164897 A1 * | 6/2018 | Huang | G06F 3/0219 |
| 2018/0164910 A1 * | 6/2018 | Ent | G06F 3/0219 |
| 2018/0334261 A1 * | 11/2018 | Longo | B64D 11/00152 |
| 2019/0106219 A1 * | 4/2019 | Parker | B64D 25/00 |
| 2020/0081603 A1 * | 3/2020 | Smith | B60K 37/06 |
| 2020/0116521 A1 * | 4/2020 | Barber | B64D 43/00 |
| 2020/0183382 A1 * | 6/2020 | Schwindt | G06F 3/011 |
| 2020/0192559 A1 * | 6/2020 | Ouellette | B64D 43/00 |
| 2020/0257446 A1 * | 8/2020 | Konishi | G06F 3/04883 |
| 2020/0319779 A1 * | 10/2020 | Staggs | G06F 3/14 |
| 2020/0328050 A1 * | 10/2020 | Files | H01H 13/7065 |

* cited by examiner

*Primary Examiner* — Vinh T Lam
(74) *Attorney, Agent, or Firm* — Ostrager Chong Flaherty & Broitman P.C.

(57) ABSTRACT

Systems and methods for enabling a user (e.g., a pilot) to input information to a computer at a flight deck display station using both a split keyboard and a touch screen. The split keyboard provides space in front of the touch-screen display device, which space is available for a pilot to use as an arm or wrist rest while manually interacting with the touch screen. For example, the split keyboard may be mounted to a shelf having an empty central or middle portion in front of the touch-screen display device. The split keyboard concept entails placing one keypad on one side and another keypad on the other side of the empty middle shelf portion, both keypads being communicatively to the keyboard controller of the computer that controls the display device. The open space between the keypads may also be used for meal trays or tablet computers.

20 Claims, 12 Drawing Sheets

US 11,008,117 B1

FLIGHT DECK DISPLAY STATION WITH SPLIT KEYBOARD

BACKGROUND

The present disclosure relates in general to systems and methods for inputting information into a computer system. In particular, the present disclosure relates to systems and methods for inputting information into a computer at a display station (e.g., on a flight deck of an aircraft).

As used herein, the term "display" means a visual representation of information which is presented in an area on a display medium (e.g., a screen) of a display device. As used herein, the terms "keyboard" and "keypad" each refer to a device including an array of manually operable buttons or keys and a microcontroller for converting mechanical key presses into electronic key codes. As used herein, the term "split keyboard" means a keyboard comprising at least two keypads which are physically separated.

A typical flight deck of an aircraft has a forward instrument panel and a control pedestal. Instruments and display devices are distributed over the forward instrument panel and control pedestal for easy access by the pilots. The display devices are electronically controlled by respective display processors to present various visual displays of information, such as primary flight displays, an engine display, and multi-function displays. For example, without limitation, such displays may include navigation displays, system displays, communication displays, information displays, flight management displays, checklist displays, other appropriate displays, or various combinations of displays.

The information displayed on the flight deck of an aircraft may be controlled to display flight information as needed. The ability to control the information displayed on the flight deck of an aircraft may simplify aircraft operation and navigation and may allow the aircraft operator to focus on the most pertinent information.

A typical flight control system for a commercial airplane comprises a flight management computer and a control display unit (CDU). The conventional method of entering and displaying information on the CDU requires multiple inputs by the pilot.

Alternative means for inputting flight information into a flight control system have been employed. For example, some flight decks are outfitted with touch-enabled screens (hereinafter "touch displays") for the pilots to interact directly with the information displays, compared to the use of an intermediary control device (e.g., a touchpad or dial). Because of the unique environment of flight, pilots contend with vibrations and turbulence, which affect their ability to smoothly, easily, and accurately interact with touch screens. Given the design constraints of displays and hardware on the flight deck, the touch screens are typically at arm length from the pilots, requiring them to nearly or fully extend their arms to reach the portion of the touch screen they wish to interact with. Since aircraft displays are typically anchored to the flight deck, vibration and turbulence can be transmitted directly to the display without any damping, making it difficult for the pilot to move his hand or fingers rapidly and precisely during flight.

SUMMARY

The subject matter disclosed in some detail below is directed to systems and methods for enabling a user (e.g., a pilot) to input information to a computer at a flight deck display station using both a split keyboard and a touch screen. The split keyboard provides space in front of the touch-screen display device, which space is available for a pilot to use as an arm or wrist rest while manually interacting with the touch screen. For example, the split keyboard may be mounted to a shelf having an empty central or middle portion (hereinafter "middle shelf portion") positioned in front of and lower than a touch-screen display device. The split keyboard concept entails placing one keypad on one side and another keypad on the other side of the empty middle shelf portion, both keypads being communicatively to the keyboard controller of the computer that controls the display device. The open space between the keypads may also be used for meal trays or tablet computers. This methodology (splitting keyboard into two separate components) provides enough space for wrist rest while working with the display for support and comfort for long duration. Also, it allows pilots to place their personal electronic devices to optimize interactivity while sitting at Emergency Flight Plan (ERP) or in cruise position.

In accordance with some embodiments, the central or middle portion of the shelf includes a movable shelf leaf located between the alphabetic and numeric keypads. The movable shelf leaf may be either slidable or rotatable (relative to the fixed left and right sides of the shelf) between the retracted and extended positions.

Although various embodiments of systems and methods for enabling a user to input information into a computer that controls a display device will be described in some detail below, one or more of those embodiments may be characterized by one or more of the following aspects.

One aspect of the subject matter disclosed in detail below is a display station comprising: a display device having a screen; a shelf comprising a left shelf portion, a right shelf portion, and a middle shelf portion that separates the left and right shelf portions and is disposed at an elevation which is lower than an elevation of a lowermost portion of the screen of the display device; a left keypad mounted to the left shelf portion and comprising a first plurality of keys having a first set of corresponding indicia representing characters; and a right keypad mounted to the right shelf portion and comprising a second plurality of keys having a second set of corresponding indicia representing characters. The left and right keypads are separated by a distance which is equal to at least 8 inches. The display system may be installed on a flight deck of an aircraft.

In accordance with various embodiments of the flight deck display station described in the immediately preceding paragraph, the middle shelf portion comprises a movable shelf leaf which is rotatable or slidable between stowed and deployed positions. In accordance with one embodiment, one of the left and right keypads has alphabetic characters and does not have numeric characters, and another of the left and right keypads has numeric characters and does not have alphabetic characters.

Another aspect of the subject matter disclosed in detail below is a system for inputting information into a computer, the system comprising: a shelf comprising a left shelf portion, a right shelf portion, and a middle shelf portion that separates the left and right shelf portions; a left keypad mounted to the left shelf portion and comprising a first plurality of keys having a first set of corresponding indicia representing characters; a right keypad mounted to the right shelf portion and comprising a second plurality of keys having a second set of corresponding indicia representing characters, wherein the middle shelf portion comprises a movable shelf leaf that is slidable or rotatable. This information input system may be installed on a flight deck of an aircraft.

A further aspect of the subject matter disclosed in detail below is a display station comprising: a display device having a screen; a shelf comprising a first shelf portion, a second shelf portion, and a third shelf portion that separates the first and second shelf portions; an alphabetic keypad mounted to the first shelf portion; and a numeric keypad mounted to the second shelf portion, wherein the third shelf portion comprises a movable shelf leaf which is movable between a retracted position, where the movable shelf leaf is disposed between the first and second shelf portions, and an extended position, where the movable shelf leaf projects beyond the left and right shelf portions at a greater distance from the screen of the display device. In accordance with one embodiment, the movable shelf leaf is rotatable between the retracted and extended positions. In accordance with another embodiment, the movable shelf leaf is slidable between the retracted and extended positions. In addition, the flight deck display station further comprises a computer comprising: a keyboard controller communicatively coupled to the left and right keypads; and a display controller communicatively coupled to the display device. Such a display system may be installed on a flight deck of an aircraft.

Other aspects of systems and methods for enabling a user to input information into a computer that controls a display device are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Illustrative embodiments of systems and methods for enabling a user to input information into a computer that controls a display device are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The following detailed disclosure describes systems and methods for inputting information into a computer that controls a display device. Certain specific details are set forth in the following description to provide a thorough understanding of various embodiments. Well-known structures, systems and methods often associated with displaying information have been either not shown or not described in detail below to avoid unnecessarily obscuring the description of the various embodiments. In addition, those of ordinary skill in the relevant art will understand that additional embodiments may be practiced without several of the details described below.

Figure 1:
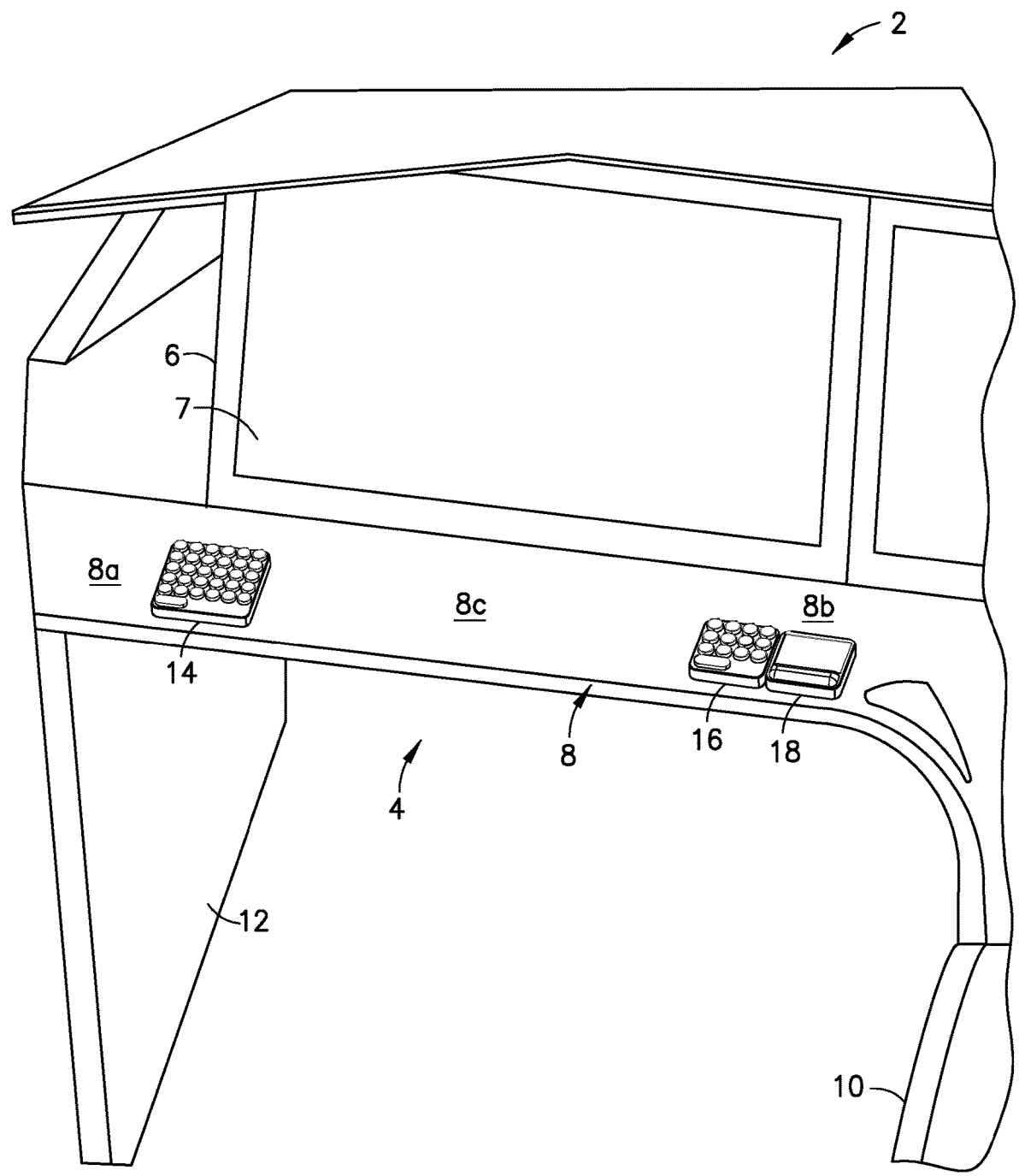
FIG. 1 is a diagram representing a three-dimensional view of a display station incorporating a split keyboard in accordance with a first embodiment. To illustrate one example application, the display station is shown installed on a flight deck of an aircraft.

FIG. 1 is a diagram representing a three-dimensional view of a display station 4 incorporating a split keyboard 14/16 in accordance with a first embodiment. The display station 4 is shown installed on a flight deck 2 of an aircraft. The display station 4 includes a display device 6 having a screen 7 (e.g., a touch screen). The display device 6 (e.g., a touch-screen display device) may be part of a flight instrument panel of the aircraft. The display station includes the display device 6 shown in FIG. 1 and a computer or processor (not shown in FIG. 1) that is programmed to control operation of the display device 6. More specifically, the display device 6 is electrically connected to a computer or processor that is configured to control the display device 6 in dependence on pilot selections.

The display station 4 further includes a shelf 8 comprising a left shelf portion 8*a*, a right shelf portion 8*b*, and a middle shelf portion 8*c* that separates the left and right shelf portions 8a and 8b. As seen in FIG. 1, the middle shelf portion 8c is disposed at an elevation which is lower than an elevation of a lowermost portion of the screen 7 of the display device 6, so that the screen 7 is viewable by a pilot seated at arm's length in front of shelf 8. As seen in FIG. 1, the shelf 8 extends to the left and to the right beyond the width of the display device 6. One end of shelf 8 is connected to and supported by a control pedestal 10 and the other end of shelf 8 is connected to and supported by a vertical support wall 12. The upper surface of shelf 8 may be flat and oriented in a horizontal plane. In accordance with the embodiment depicted in FIG. 1, the shelf is horizontal and the screen 7 of the display device 6 leans away from the pilot at a small angle (e.g., 5 to 10 degrees) relative to a vertical plane.

The display station 4 further includes a split keyboard 14/16 in the form of a left keypad 14 (shown in isolation in FIG. 2) mounted to the left shelf portion 8a and a right keypad 16 (shown in isolation in FIG. 3) mounted to the right shelf portion 8b. The display station 4 further includes a touchpad 18 (shown in isolation in FIG. 4) mounted to the right shelf portion 8b.

Figure 2:
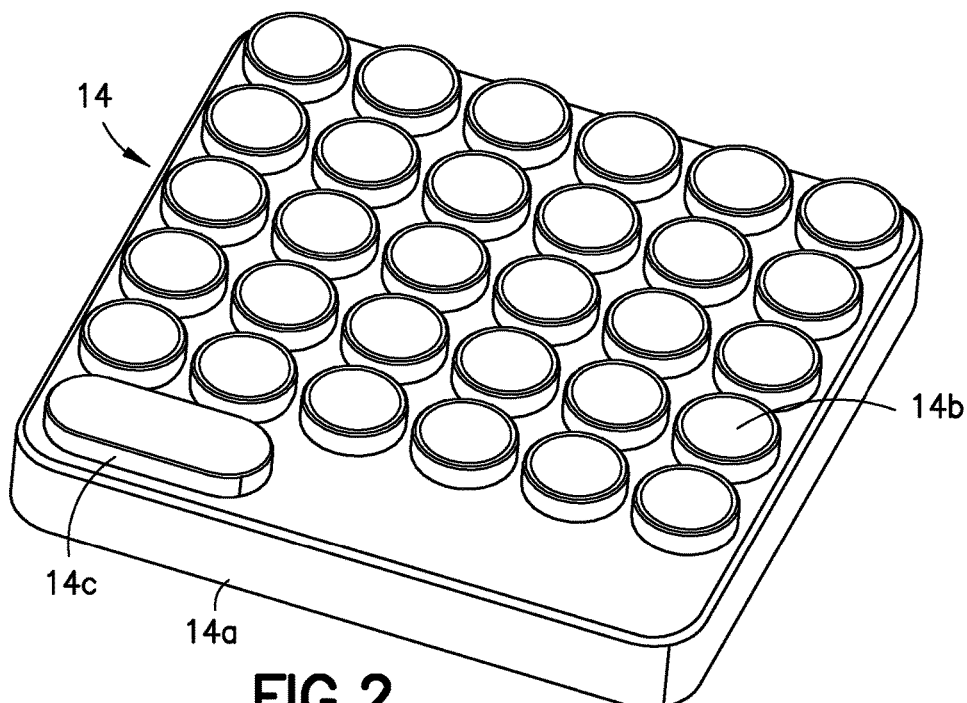
FIG. 2 is a diagram representing a three-dimensional view of the alphabetic keyboard incorporated in the display station depicted in FIG. 1.

As seen in FIG. 2, the left keypad 14 comprises a base 14a, a plurality of manually operable keys 14b (hereinafter "keys 14b") having a set of corresponding indicia representing characters, and a manually operable Enter button 14c. In accordance with one proposed implementation, the characters of keys 14b (not shown in FIG. 2) include at least the twenty-six letters of the English alphabet and do not include any of the ten single-digit numerals 0 to 9.

Figure 3:
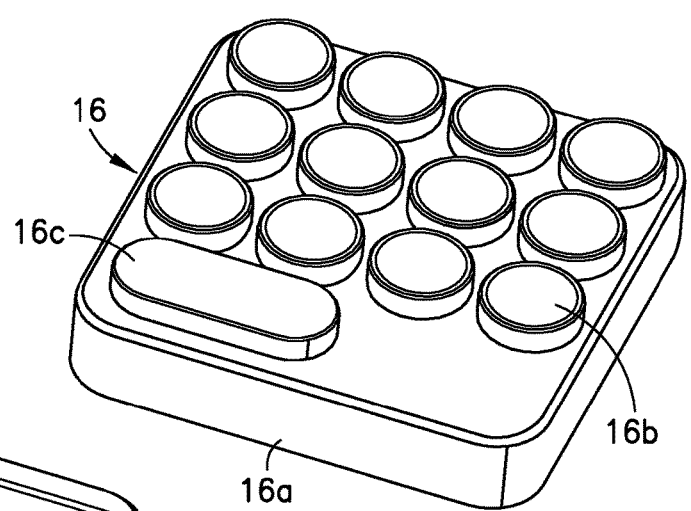
FIG. 3 is a diagram representing a three-dimensional view of the numeric keyboard incorporated in the display station depicted in FIG. 1.

As seen in FIG. 3, the right keyboard 16 comprises a base 16a, a plurality of manually operable keys 16b (hereinafter "keys 16b") having a set of corresponding indicia representing characters, and a manually operable Execute button 16c. In accordance with one proposed implementation, the characters of keys 16b (not shown in FIG. 3) include at least ten single-digit numerals 0 to 9 and do not include any letters of the English alphabet.

Figure 4:
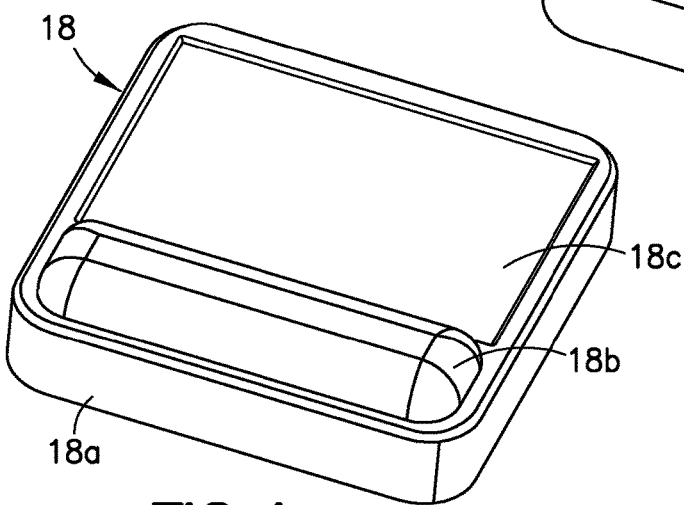
FIG. 4 is a diagram representing a three-dimensional view of the 111 incorporated in the display station depicted in FIG. 1.

As seen in FIG. 4, the touchpad 18 comprises a base 18a, a finger/wrist rest 18b, and a touch-sensitive surface 18c (capacitive or resistive) that can translate the motion and position of a user's finger to a cursor output to the display device 6.

While viewing the screen 7 of the display device 6, a pilot seated in a pilot seat (not shown in FIG. 1) within arm's length of the shelf 8 may manually enter data using the keypads. As seen in FIG. 1, the shelf space between left keypad 14 and right keypad 16 is unoccupied and free for other uses. For example, if the screen 7 of display device 6 is a touch screen, then the pilot may use the upper surface of the middle shelf portion 8c as a wrist or forearm rest while touching the screen 7.

An alternative use is that a pilot may place a meal tray on the upper surface of the middle shelf portion 8c. The empty space between the alphabetic and numeric keypads of the split keyboard 14/16 may also be used as a workspace that supports a tablet computer. The most popular tablet computers have various widths, such as 8.0, 9.4, 9.74, and 11.04 inches. Therefore, in accordance with one proposed implementation, the left and right keypads are separated by a distance which is equal to at least 8 inches.

In accordance with alternative embodiments, the available shelf space between the keypads of a split keyboard 14/16 may be increased by incorporating a middle shelf portion that is extendable in a direction toward the pilot (away from the display device). In accordance with one embodiment, the middle shelf portion comprises a movable shelf leaf which is slidable along a linear path between retracted and extended positions. The slidable shelf embodiment is described below with reference to FIGS. 5A, 5B, and 6A-6C. In accordance with another embodiment, the middle shelf portion comprises a movable shelf leaf which is rotatable about a fixed pivot between retracted and extended positions. The rotatable shelf embodiment is described below with reference to FIGS. 7A-7C, 8A, and 8B.

Figure 5A:
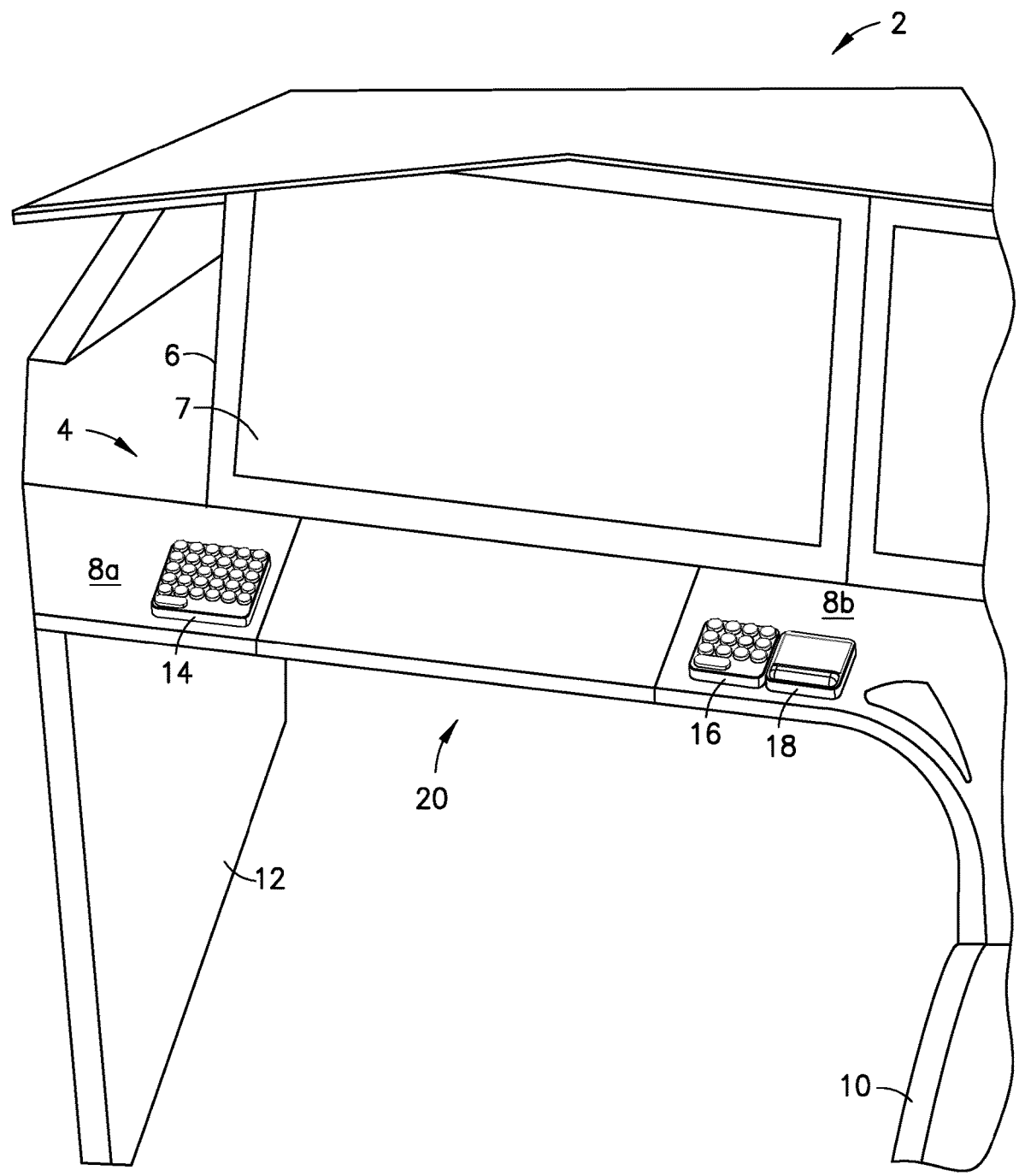
FIGS. 5A and 5B are diagrams representing three-dimensional views of a display station incorporating a split keyboard and a sliding shelf leaf (shown stowed in FIG. 5A and deployed in FIG. 5B) in accordance with a second embodiment. To illustrate one example application, the display station is shown installed on a flight deck of an aircraft.
Figure 5B:
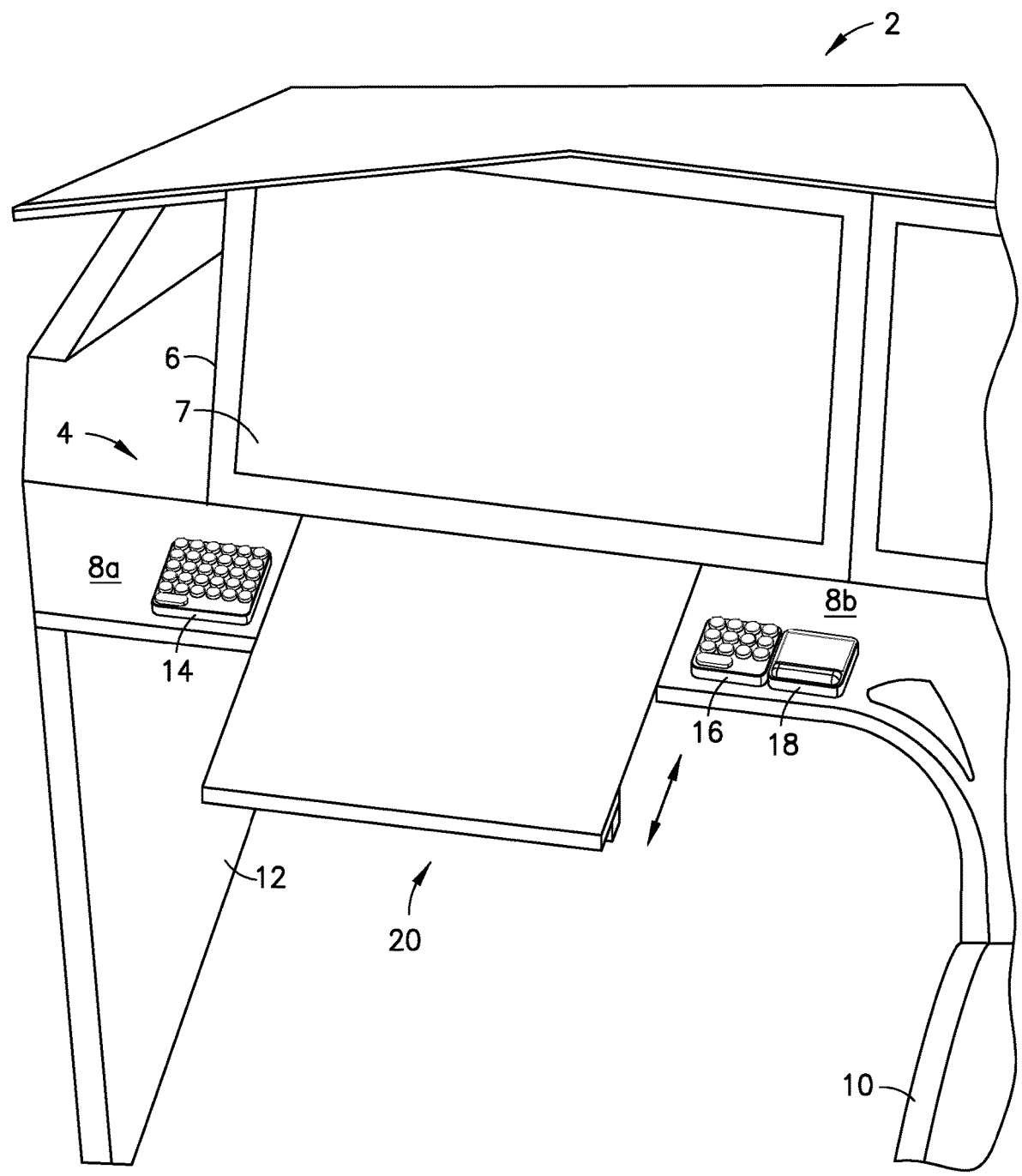

FIGS. 5A and 5B are diagrams representing three-dimensional views of a display station 4 incorporating a split keyboard 14/16 and a sliding shelf leaf 20 in accordance with a second embodiment. In FIG. 5A, the sliding shelf leaf 20 is shown in a stowed position; in FIG. 5B, the sliding shelf leaf 20 is shown in a deployed position. In accordance with the second embodiment, the portion of the sliding shelf leaf 20 which extends in front of the display device 6 (as seen in FIG. 5B) is part of the middle shelf portion 8c. A left keypad 14 is mounted to the left shelf portion 8a and a right keypad 16 is mounted to the right shelf portion 8b. The left keypad 14 and right keypad 16 form a split keyboard 14/16 separated by the sliding shelf leaf 20.

Figure 6:
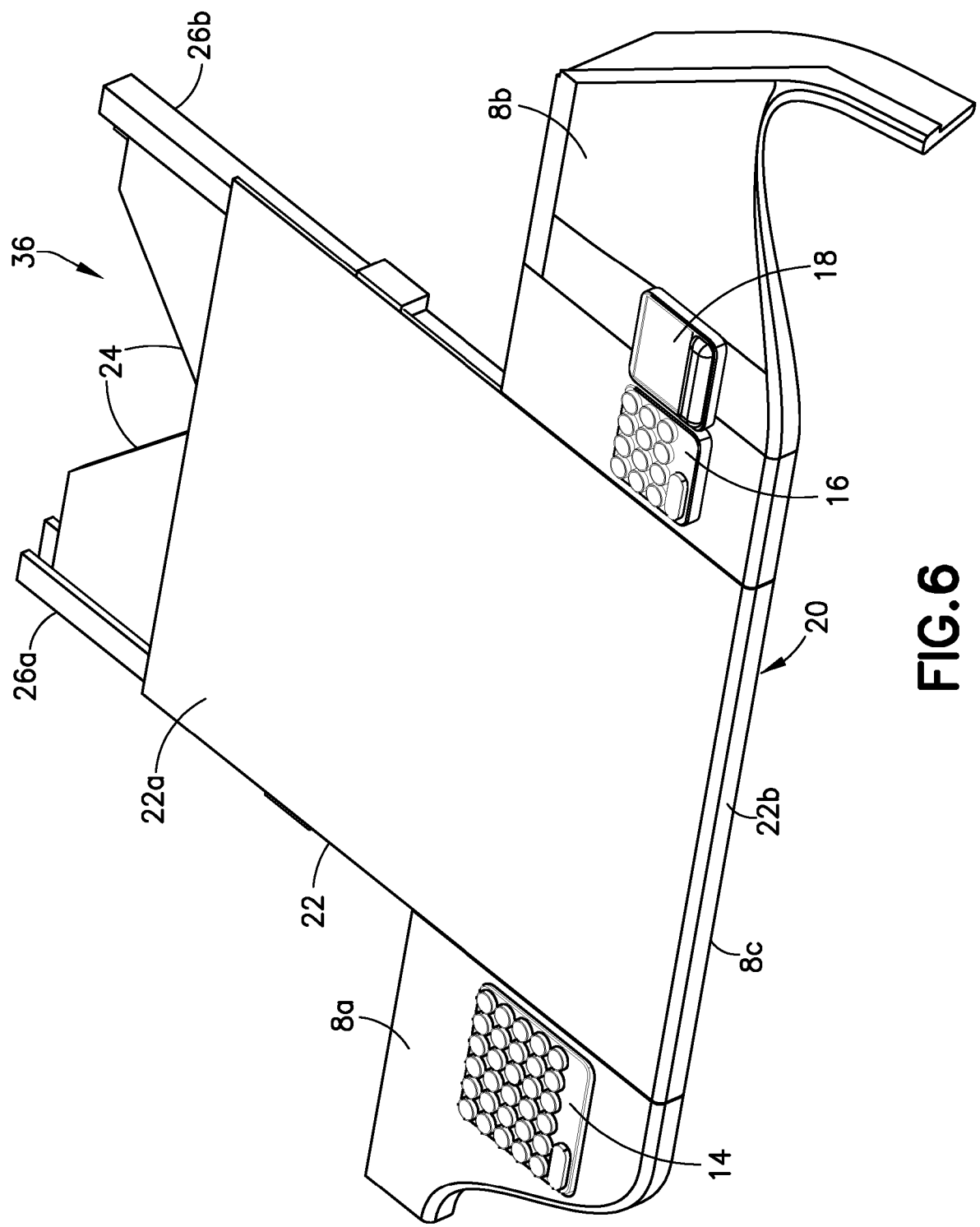
FIG. 6 is a diagram representing a three-dimensional view of the shelf with split keyboard and stowed sliding shelf leaf seen in FIG. 5A.
Figure 6A:
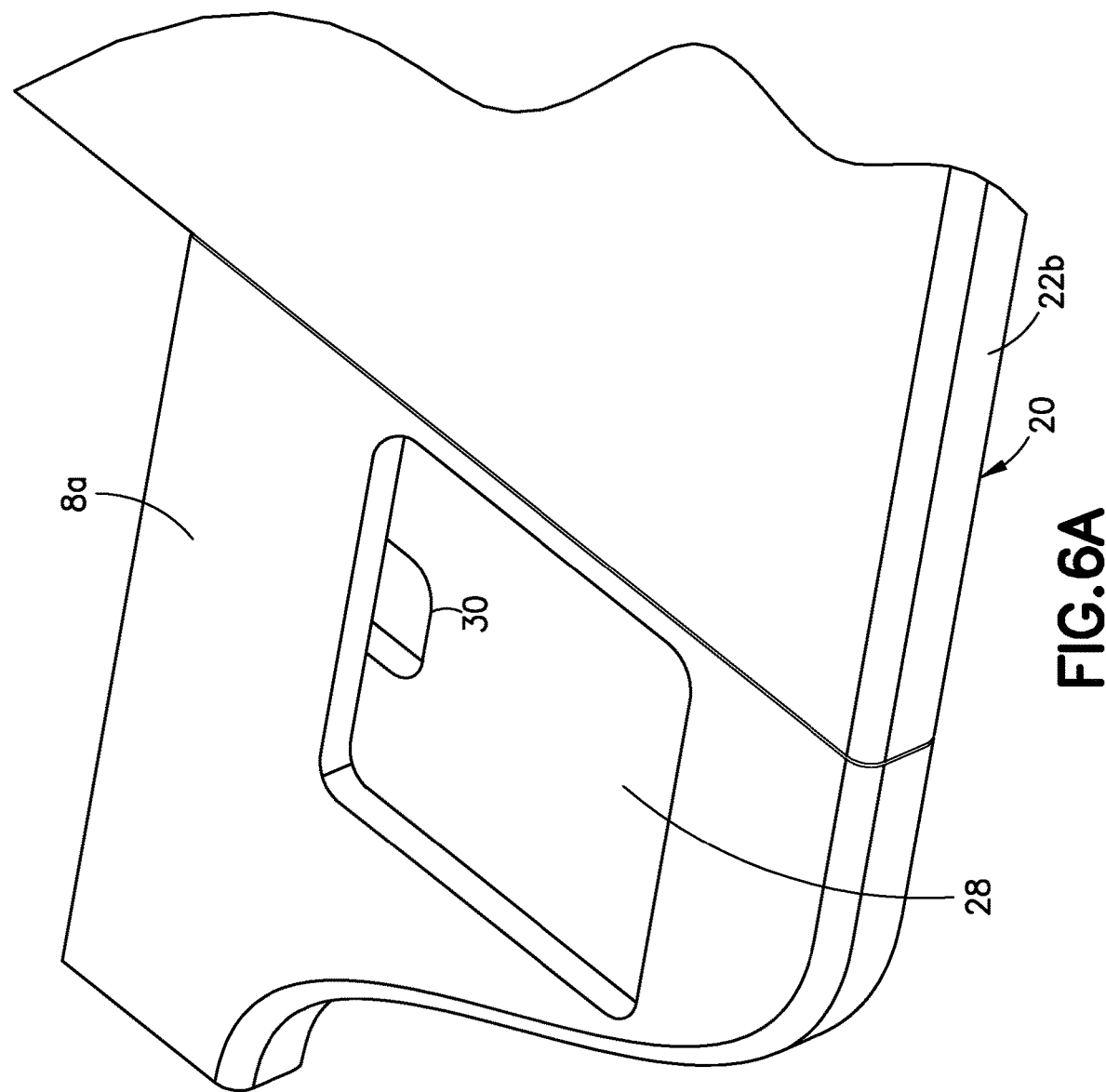
FIG. 6A is a diagram representing a three-dimensional view of the left shelf portion of the shelf depicted in FIG. 6 with the keypad removed.

FIG. 6 is a diagram representing a three-dimensional view of the shelf 8 with split keyboard 14/16 and stowed (retracted) sliding shelf leaf 20 seen in FIG. 5A. The split keyboard 14/16 includes a left keypad 14 mounted to the left shelf portion 8a and a right keypad 16 mounted to the right shelf portion 8b. The left keypad 14 and right keypad 16 include respective bases (see bases 14a and 16b in FIGS. 2 and 3 respectively) which are seated in respective recesses formed in the shelf 8. The left keypad 14 and right keypad 16 further include respective embedded microcontrollers which are communicatively coupled to a computer by way of respective electrical cables (not shown in FIG. 1). The electrical cables from the keypads to the computer system pass through respective openings in shelf 8, which openings communicate with the aforementioned recesses. For example, FIG. 6A is a diagram representing a three-dimensional view of the left shelf portion 8a of shelf 8 with the left keypad 14 removed to reveal a recess 28 and an opening 30. The base 14a of the left keypad 14 sits in the recess 28; the electrical cable from the left keypad 14 to a computer onboard the aircraft passes through the opening 30.

As seen in FIG. 6, the display station further includes a pair of linear guides 26a and 26b (hereinafter "left linear guide 26a" and "right linear guide 26b") which slidably support opposite sides of the sliding shelf leaf 20. The sliding shelf leaf 20 includes an upper panel 22 and a lower panel 24 made of rigid or fiber-reinforced plastic material. The lower panel 24 has a pair of mutually parallel linear projections (not visible in FIG. 6) which are slidably seated in respective linear grooves of the left and right linear guides 26a and 26b. The left and right linear guides 26a and 26b are respectively attached to the left and right shelf portions 8a and 8b of shelf 8 in mutually parallel relationship. Thus, the lower panel 24 is slidable along the left and right linear guides 26a and 26b. The left and right linear guides 26a and 26b are positioned relative to shelf 8 so that their linear grooves are parallel to the plane of the flat upper surfaces of left and right shelf portions 8a and 8b. In accordance with one proposed implementation, the lower panel 24 has a cutout 36 configured to provide clearance with existing support structure of an aircraft when the sliding shelf leaf 20 is in its retracted position.

The upper panel 22 is affixed to the lower panel 24, so that the upper panel 22 moves in tandem with the lower panel 24 as the latter slides along the left and right linear guides 26a and 26b. The left and right linear guides 26a and 26b are positioned relative to shelf 8 so that the flat upper surface of upper panel 22 is parallel to and aligned with the flat upper surfaces of left and right shelf portions 8a and 8b as the sliding shelf leaf 20 moves during extension and retraction.

The upper panel 22 comprises a horizontal board 22a and a flange 22b that is integrally formed with one edge of horizontal board 22a and extends downward perpendicular to the plane of horizontal board 22a. The upper panel 22 also includes a cross beam (not visible in FIG. 6) that extends the full width of the upper panel 22. One face of the cross beam is adhered to the horizontal board 22a and an adjacent face of the cross beam is adhered to the flange 22b. A pilot may grip the sliding shelf leaf 20 in the area of cross beam using a thumb and an index finger to pull the sliding shelf leaf 20 manually from the fully retracted position to a partially or fully extended position. Later the sliding shelf leaf 20 may be retracted by the pilot pushing the sliding shelf leaf 20 forward and toward the display device 6.

Figure 6B:
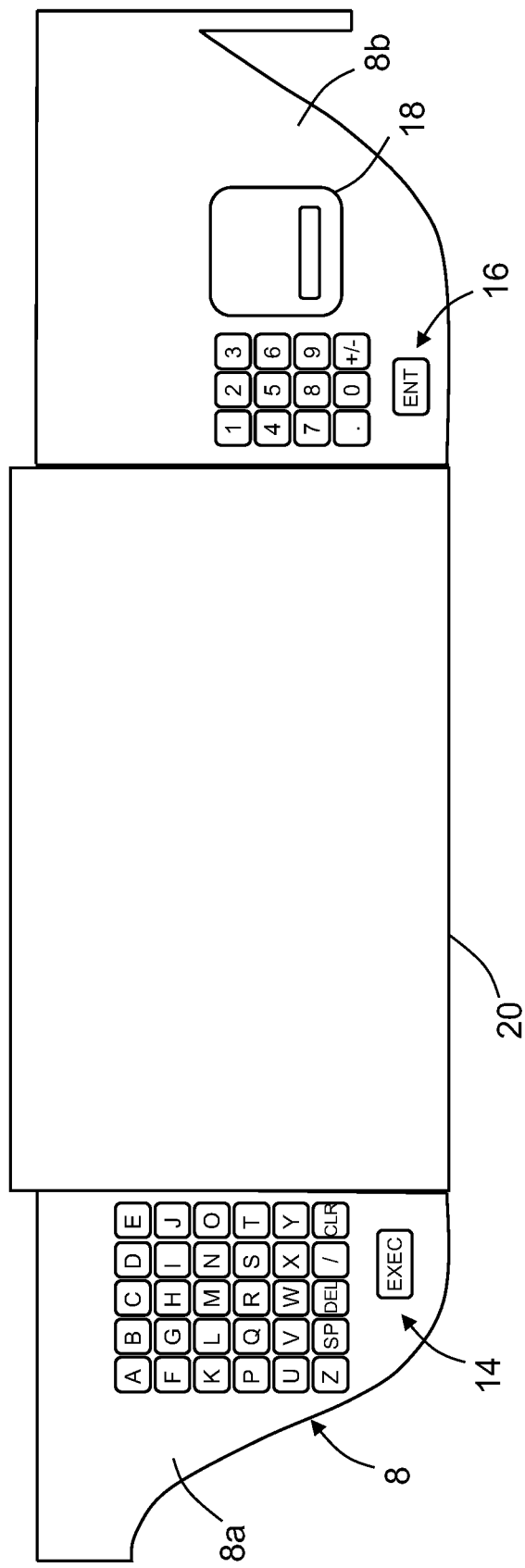
FIG. 6B is a diagram representing a top view of a shelf with stowed sliding shelf leaf in which the keypads of the split keyboard have alternative configurations of keys.

FIG. 6B is a diagram representing a top view of a shelf 8 with stowed sliding shelf leaf 20 in which the left and right keypads 14 and 16 have alternative configurations of keys. In this example, the left keypad 14 includes the following keys: twenty-six keys bearing the twenty-six letters of the English alphabet, a Space key, a Delete key, a key for the slash symbol, a Clear key, and an Execute (EXEC) key. The right keypad 16 includes the following keys: ten keys bearing the numerals 0 to 9, a period key, a key bearing the mathematical symbol "±", and an Enter key.

Figure 7A:
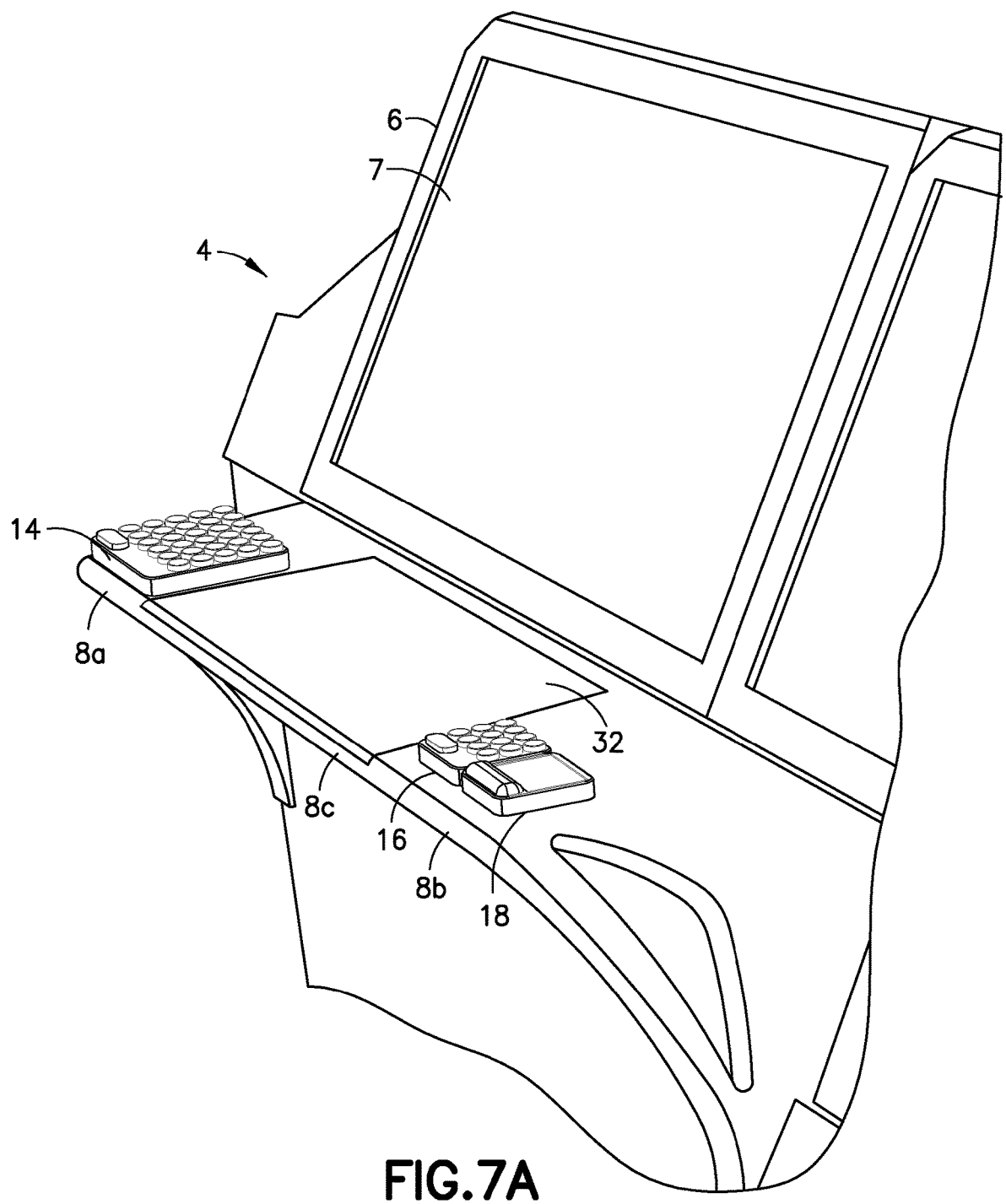
FIGS. 7A, 7B, and 7C are diagrams representing three-dimensional views of a display station incorporating a split keyboard and a folding (rotatable) shelf (shown stowed in FIG. 14A, at an intermediate position in FIG. 14B, and deployed in FIG. 14C) in accordance with a third embodiment. To illustrate one example application, the display station is shown installed on a flight deck of an aircraft.
Figure 7B:
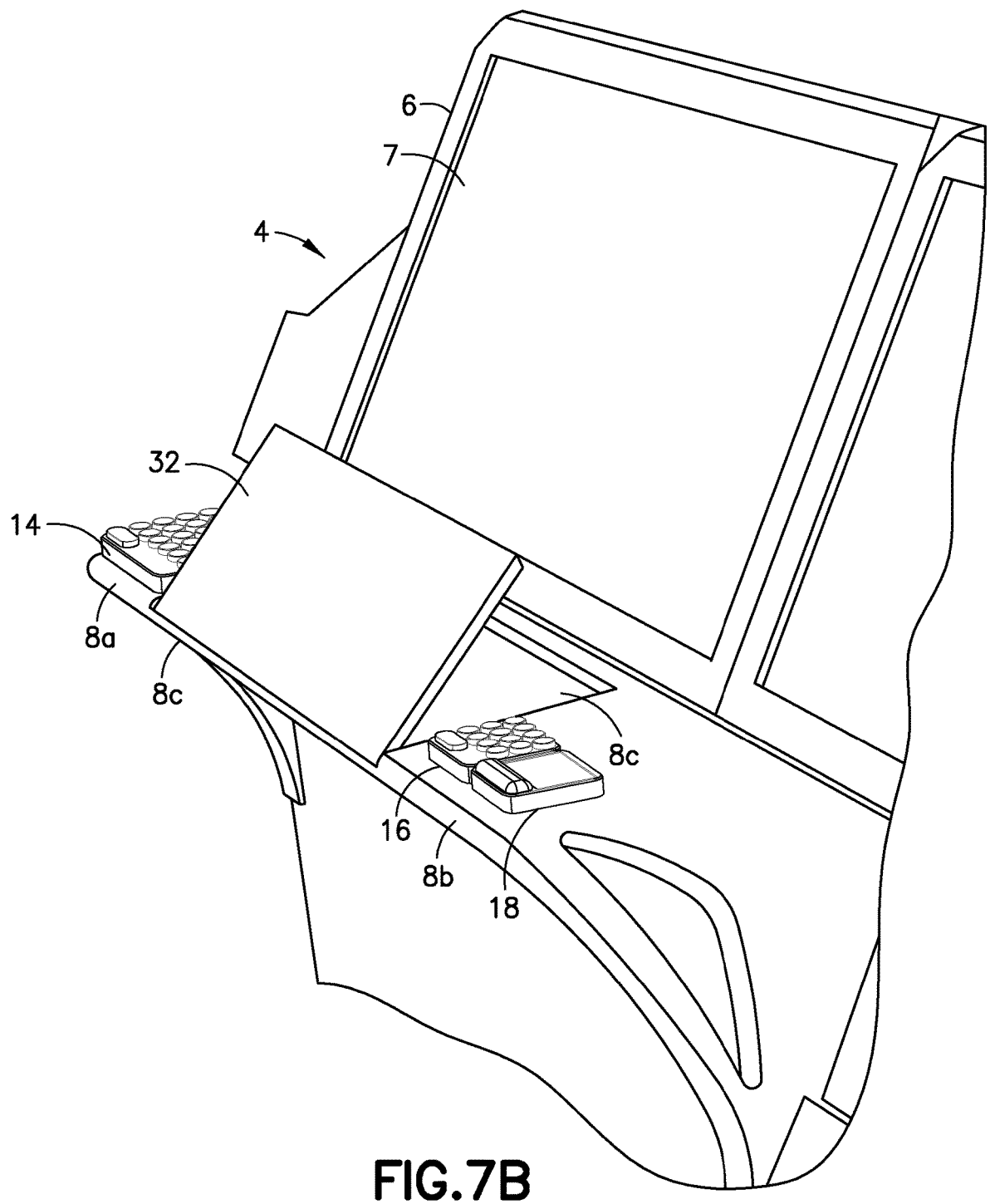
Figure 7C:
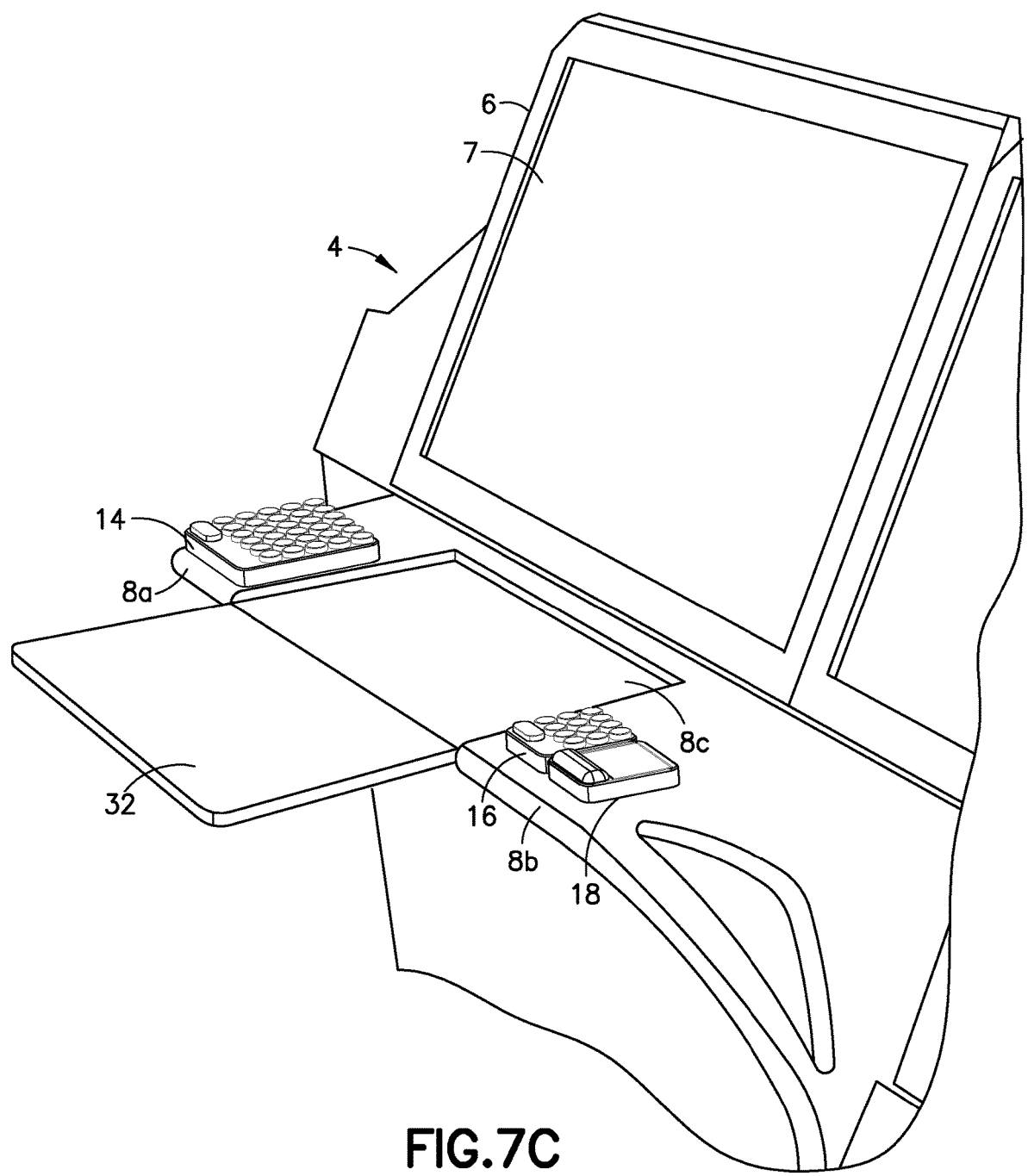

FIGS. 7A-7C are diagrams representing three-dimensional views of a display station 4 having a movable shelf leaf (hereinafter "folding shelf leaf 32") that is rotatable between stowed and deployed positions in accordance with an alternative embodiment. Except for the middle shelf portion 8c, the structure of the display station 4 depicted in FIGS. 7A-7C may be substantially the same as the structure of the display station 4 depicted in FIG. 1. The display station 4 includes a display device 6 having a screen 7. The display station 4 further includes a shelf 8 comprising a left shelf portion 8a, a right shelf portion 8b, and a middle shelf portion 8c that separates the left and right shelf portions 8a and 8b. The display station 4 depicted in FIGS. 14A-14C further includes a split keyboard 14/16 in the form of a left keypad 14 mounted to the left shelf portion 8a and a right keypad 16 mounted to the right shelf portion 8b.

The middle shelf portion 8c depicted in FIGS. 7A-7C includes a non-extendable shelf panel 34 and the folding shelf leaf 32. The non-extendable shelf panel 34 connects the left shelf portion 8a to the right shelf portion 8b. The folding shelf leaf 32 is rotatably coupled to the non-extendable shelf panel 34 by means of a pair of concealed hinges (not shown in FIGS. 7A-7C). The folding shelf leaf 32 is shown in a retracted angular position (stowed) in FIG. 14A, in an intermediate angular position in FIG. 14B, and in an extended angular position (deployed) in FIG. 14C. In accordance with one proposed implementation, during rotation from the stowed angular position to the deployed angular position, the folding shelf leaf 32 rotates 180 degrees.

The non-extendable shelf panel 34 is offset from the left and right shelf portions 8a and 8b to form a recess which receives the folding shelf leaf 32. The folding shelf leaf 32 lies on top of the non-extendable shelf panel 34 when the folding shelf leaf 32 is in the retracted angular position seen in FIG. 7A. Although not shown in FIG. 7A, the folding shelf leaf 32 may be provided with a recessed or projecting portion which may be grasped by the pilot between fingers and an opposing thumb and then manipulated to cause the folding shelf leaf 32 to rotate about a pivot axis.

Figure 8A:
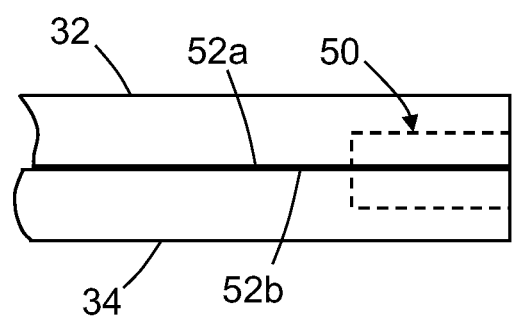
FIGS. 8A and 8B are diagrams representing side views of a portion of a folding shelf leaf rotatably coupled to a non-extendable shelf panel by means of a pair of concealed hinges in respective states: a stowed state (shown in FIG. 8A) and a deployed state (shown in FIG. 8B).
Figure 8B:
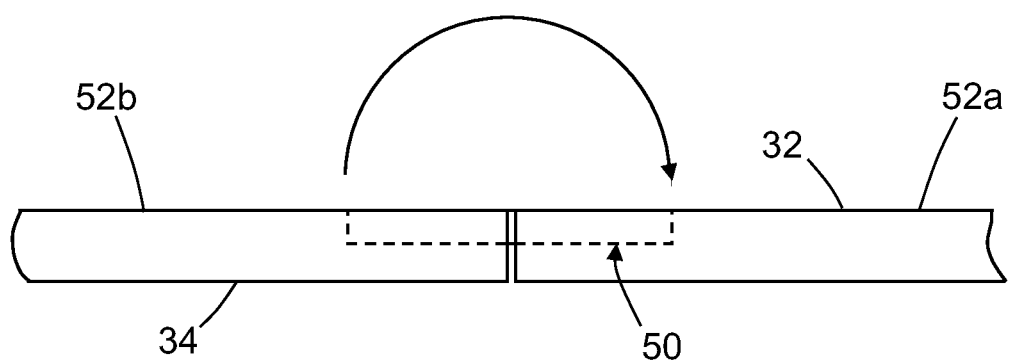

FIGS. 8A and 8B are diagrams representing side views of respective portions of a folding shelf leaf 32 having a planar surface 52a and a non-extendable shelf panel 34 having a planar surface 52b. The folding shelf leaf 32 is shown in a stowed state FIG. 8A and in a deployed state in FIG. 8B. The dashed lines roughly indicate respective spaces formed in the folding shelf leaf 32 and non-extendable shelf panel 34 which are partly occupied by respective portions of a concealed hinge 50. Although the structure of the concealed hinge 50 is not shown, one pair of commercially available concealed hinges having a suitable configuration and suitably sized may be used. The concealed hinge 50 must be configured to enable the folding shelf leaf 32 to rotate 180 degrees from the retracted position seen in FIG. 8A (with the folding shelf leaf 32 disposed parallel to and on top of non-extendable shelf panel 34 with mutually parallel surfaces 52a and 52b overlapping in contact) to the extended position seen in FIG. 8B (with the folding shelf leaf 32 disposed parallel and adjacent to non-extendable shelf panel 34 with mutually parallel surfaces 52a and 52b coplanar and not overlapping). In the state depicted in FIG. 8B, a meal tray or tablet computer (not shown) may be placed on the surfaces 52a and 52b.

Figure 9:
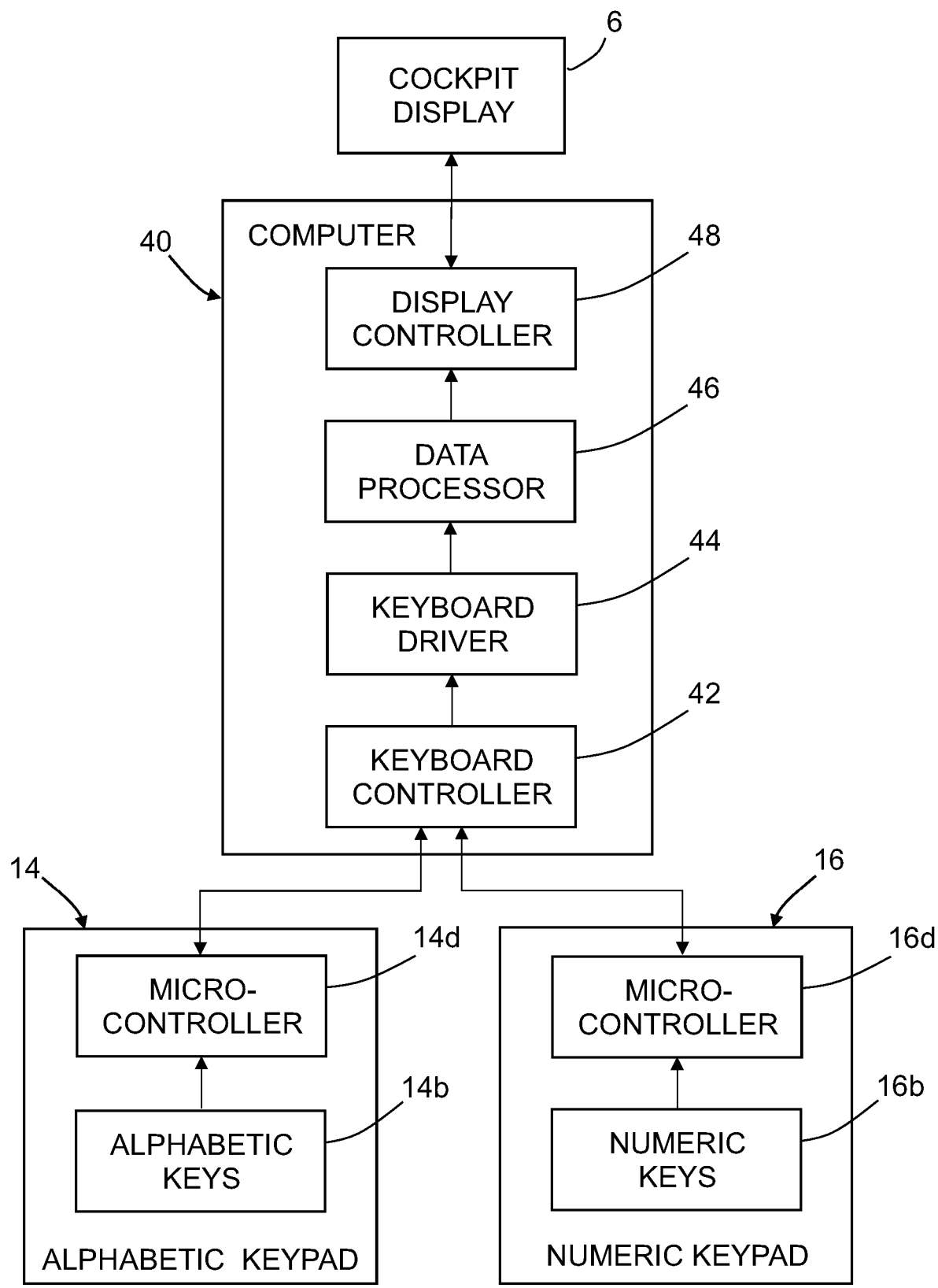
FIG. 9 is a block diagram identifying components of some components of a display station that includes a split keyboard in the form of left and right keypads.

FIG. 9 is a block diagram identifying components of some components of a display station that includes a split keyboard in the form of physically separated keypads that are communicatively coupled to the same keyboard controller. The components identified in FIG. 9 include a computer 40, a left keypad 14, a right keypad 16, and a display device 6. The left keypad 14 includes a plurality of alphabetic keys 14b and an embedded microcontroller 14d; the right keypad 16 includes a plurality of numeric keys 16b and an embedded microcontroller 16d. Each microcontroller is configured to generate scan codes in dependence on which keys are pressed by the system user.

The computer 40 includes a keyboard controller 42, a keyboard driver 44, a data processor 46, and a display controller 48. The keyboard controller 42 is a module or device that interfaces the left keypad 14 and right keypad 16 to the keyboard driver 44. The main function of the keyboard controller 42 is to notify the keyboard driver 44 when a key is pressed or released. When data from the split keyboard 14/16 arrives, the keyboard controller 42 raises an interrupt to allow the keyboard driver 44 to handle the input. More specifically, the keyboard controller 42 receives scancodes from the embedded microcontrollers 14d and 16d via a serial interface. The keyboard driver 44 comprises files and programs that enable the operating system to recognize and process the data received from the split keyboard 14/16 and return commands from the computer 40 (such as signals which control the keyboard's light-emitting diodes. The data processor 46 processes the data received from the split keyboard 14/16 and then instructs the display controller 48 to display the information requested by the system user according to the keys that were pressed. Although not shown in FIG. 8, computer 40 may include modules which communicate with other computers to get information to be presented on the display device 6.

If the display device 6 has a touch screen, then the display controller 48 is configured to receive data from the touch screen. As used herein, the term "touch screen" means a display which contains any type or combination of user input sensor(s) integrated into a display assembly, which can detect, track and output the coordinates of finger or stylus position on or near the display surface. The user can use the touch screen to interact directly with what is displayed and, if the software allows, to control how information is displayed; for example, zooming to increase the text size.

As described above, the computer 40 includes various functional units that may be integrated in respective modules that form respective parts of the internal configuration of the computer. For example, a module may be implemented as a hardware circuit comprising integrated circuits or gate arrays, off-the-shelf semiconductors such as logic chips, transistors, or other discrete components. A module may also be implemented in programmable hardware devices such as field-programmable gate arrays, programmable array logic, programmable logic devices or the like. Modules may also be implemented in software for execution by various types of processors. An identified module of computer-readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

While systems and methods for enabling a user to input information into a computer that controls a display device have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The embodiments disclosed above use one or more processing or computing devices. Such devices typically include a processor, computing device, or controller, such as a general-purpose central processing unit, a microcontroller, a reduced instruction set computer processor, an ASIC, a programmable logic circuit, an FPGA, a digital signal processor, and/or any other circuit or processing device capable of executing the functions described herein. The methods described herein may be encoded as executable instructions embodied in a non-transitory tangible computer-readable storage medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms "processor" and "computing device". As used herein, the term "computer system" should be construed broadly to encompass a system having at least one computer or processor, and which may have multiple computers or processors that communicate through a network or bus.

The invention claimed is:

1. A flight deck display station comprising:
a control pedestal;
a pilot seat positioned to one side of the control pedestal;
a display device having a screen positioned at arm's length in front of the pilot seat;
a shelf positioned between the display device and the pilot seat, the shelf comprising a horizontal left shelf portion, a horizontal right shelf portion, and a horizontal middle shelf portion that is disposed between and separates the left and right shelf portions;
a left keypad mounted to the left shelf portion and comprising a first plurality of keys having a first set of corresponding indicia representing characters; and
a right keypad mounted to the right shelf portion and comprising a second plurality of keys having a second set of corresponding indicia representing characters,
wherein the left and right keypads are positioned between the display device and the pilot seat separated by a distance which is equal to at least 8 inches.

2. The flight deck display station as recited in claim 1, wherein the middle shelf portion comprises a movable shelf leaf which is movable between a retracted position, where the movable shelf leaf is disposed between the first and second shelf portions, and an extended position, where the movable shelf leaf projects beyond the left and right shelf portions at a greater distance from the screen of the display device.

3. The flight deck display station as recited in claim 2, wherein:
the middle shelf portion further comprises a non-extendable shelf panel affixed to the left and right shelf portions; and
the movable shelf leaf in a retracted position is disposed on top of the non-extendable shelf panel.

4. The flight deck display station as recited in claim 3, wherein the movable shelf leaf is rotatable relative to the non-extendable shelf panel from the retracted position to extended position.

5. The flight deck display station as recited in claim 4, further comprising a pair of concealed hinges that rotatably couple the movable shelf leaf to the non-extendable shelf panel.

6. The flight deck display station as recited in claim 5, wherein the movable shelf leaf has a first angular position in the retracted position and a second angular position in the extended position, the first and second angular positions being separated by an angle equal to approximately 180 degrees.

7. The flight deck display station as recited in claim 2, wherein the movable shelf leaf is slidable relative to the left and right shelf portions between the retracted position and the extended position.

8. The flight deck display station as recited in claim 1, further comprising a computer comprising:
a keyboard controller communicatively coupled to the left and right keypads; and
a display controller communicatively coupled to the display device.

9. The flight deck display station as recited in claim 1, wherein one of the left and right keypads has alphabetic characters and does not have numeric characters, and another of the left and right keypads has numeric characters and does not have alphabetic characters.

10. The flight deck display station as recited in claim 1, wherein the flight deck display station is incorporated on a flight deck of an aircraft.

11. A flight deck display system for inputting information into a computer, the system comprising:
a control pedestal;
a pilot seat positioned to one side of the control pedestal;
a display device having a screen positioned in front of the pilot seat and forward of the control pedestal;
a shelf positioned between the display device and the pilot seat, the shelf comprising a horizontal left shelf portion, a horizontal right shelf portion, and a horizontal middle shelf portion that separates the left and right shelf portions;

a left keypad mounted to the left shelf portion and comprising a first plurality of keys having a first set of corresponding indicia representing characters;

a right keypad mounted to the right shelf portion and comprising a second plurality of keys having a second set of corresponding indicia representing characters, wherein the left and right keypads are positioned between the display device and the pilot seat, and wherein the middle shelf portion comprises a movable shelf leaf that projects beyond the left and right shelf portions when the movable shelf leaf is in an extended position and does not project beyond the left and right shelf portions when the movable shelf leaf is in a retracted position.

12. The flight deck display system as recited in claim 11, wherein:

the middle shelf portion further comprises a non-extendable shelf panel affixed to the left and right shelf portions; and the movable shelf leaf in a retracted position is disposed on top of the non-extendable shelf panel.

13. The flight deck display system as recited in claim 12, wherein the movable shelf leaf is rotatable relative to the non-extendable shelf panel between the retracted and extended positions.

14. The flight deck display system as recited in claim 11, wherein the movable shelf leaf is slidable relative to the left and right shelf portions between the retracted position and the extended position.

15. The flight deck display system as recited in claim 11, wherein the computer comprises a keyboard controller communicatively coupled to the left and right keypads.

16. The flight deck display system as recited in claim 11, wherein the system is incorporated on a flight deck of an aircraft.

17. A flight deck display station comprising:

a control pedestal;

a pilot seat positioned to one side of the control pedestal;

a display device having a screen positioned at arm's length in front of the pilot seat;

a shelf positioned between the display device and the pilot seat, the shelf comprising a horizontal first shelf portion, a horizontal second shelf portion, and a horizontal third shelf portion that is disposed between and separates the first and second right shelf portions;

an alphabetic keypad mounted to the first shelf portion; and a numeric keypad mounted to the second shelf portion, wherein the alphabetic and numeric keypads are positioned between the display device and the pilot seat; and wherein the third shelf portion comprises a movable shelf leaf which is movable between a retracted position, where the movable shelf leaf is disposed between the first and second shelf portions, and an extended position, where the movable shelf leaf projects beyond the left and right shelf portions at a greater distance from the screen of the display device.

18. The flight deck display station as recited in claim 17, wherein the movable shelf leaf is rotatable between the retracted and extended positions.

19. The flight deck display station as recited in claim 17, wherein the movable shelf leaf is slidable between the retracted and extended positions.

20. The flight deck display station as recited in claim 17, further comprising a computer comprising:

a keyboard controller communicatively coupled to the left and right keypads; and a display controller communicatively coupled to the display device.

* * * * *